United States Patent [19]

Hart et al.

[11] 4,249,875
[45] Feb. 10, 1981

[54] CO-EXTRUSION APPARATUS AND METHOD FOR PRODUCING MULTIPLE-LAYERED THERMOPLASTIC PIPE

[75] Inventors: Edward Hart; Raleigh N. Rutledge, both of Big Spring, Tex.

[73] Assignee: Cosden Technology, Inc., Dallas, Tex.

[21] Appl. No.: 942,792

[22] Filed: Sep. 15, 1978

Related U.S. Application Data

[63] Continuation-in-part of Ser. No. 812,041, Jul. 1, 1977, abandoned.

[51] Int. Cl.³ .................. B29D 23/04; B29D 9/00
[52] U.S. Cl. .................. 425/133.1; 425/380; 425/462
[58] Field of Search .................. 264/173, 45.9; 425/133.1, 462, 380, 97, 467

[56] References Cited

U.S. PATENT DOCUMENTS

| 2,501,690 | 3/1950 | Prendergast | 264/173 |
|---|---|---|---|
| 2,632,205 | 3/1953 | Harris | 264/173 |
| 3,308,508 | 3/1967 | Schrenk | |
| 3,423,498 | 1/1969 | Lefevre | 264/173 |
| 3,819,792 | 6/1974 | Ono et al. | 264/173 |
| 4,061,461 | 12/1977 | Hessenthaler | 264/173 |
| 4,125,585 | 11/1978 | Rosenbaum | 264/173 |
| 4,134,952 | 1/1979 | Yoshikawa et al. | 264/173 |

Primary Examiner—James B. Lowe
Attorney, Agent, or Firm—Schwartz, Jeffery, Schwaab, Mack, Blumenthal & Koch

[57] ABSTRACT

A melt extrusion process and apparatus for producing a multiple-layered pipe (preferably of two or more thermoplastic resins) are disclosed. The process comprises extruding a cylindrical stream of thermoplastic material, converting the cylindrical stream to an annular stream, applying at least one inner annular layer of thermoplastic to the inner surface of the annular stream, applying at least one outer annular layer of thermoplastic material to the annular stream, and extruding the resultant multiple-layered annular stream. Apparatus for producing this pipe includes a modular pipe die having inside and outside laydown means, flow equalizing means within each of the inner and outer laydown means to obviate layer imperfections, and adjustable means to control the concentricity of the outer layers. The invention finds particular application in the production of a thermoplastic pipe having an intermediate expanded core.

17 Claims, 10 Drawing Figures

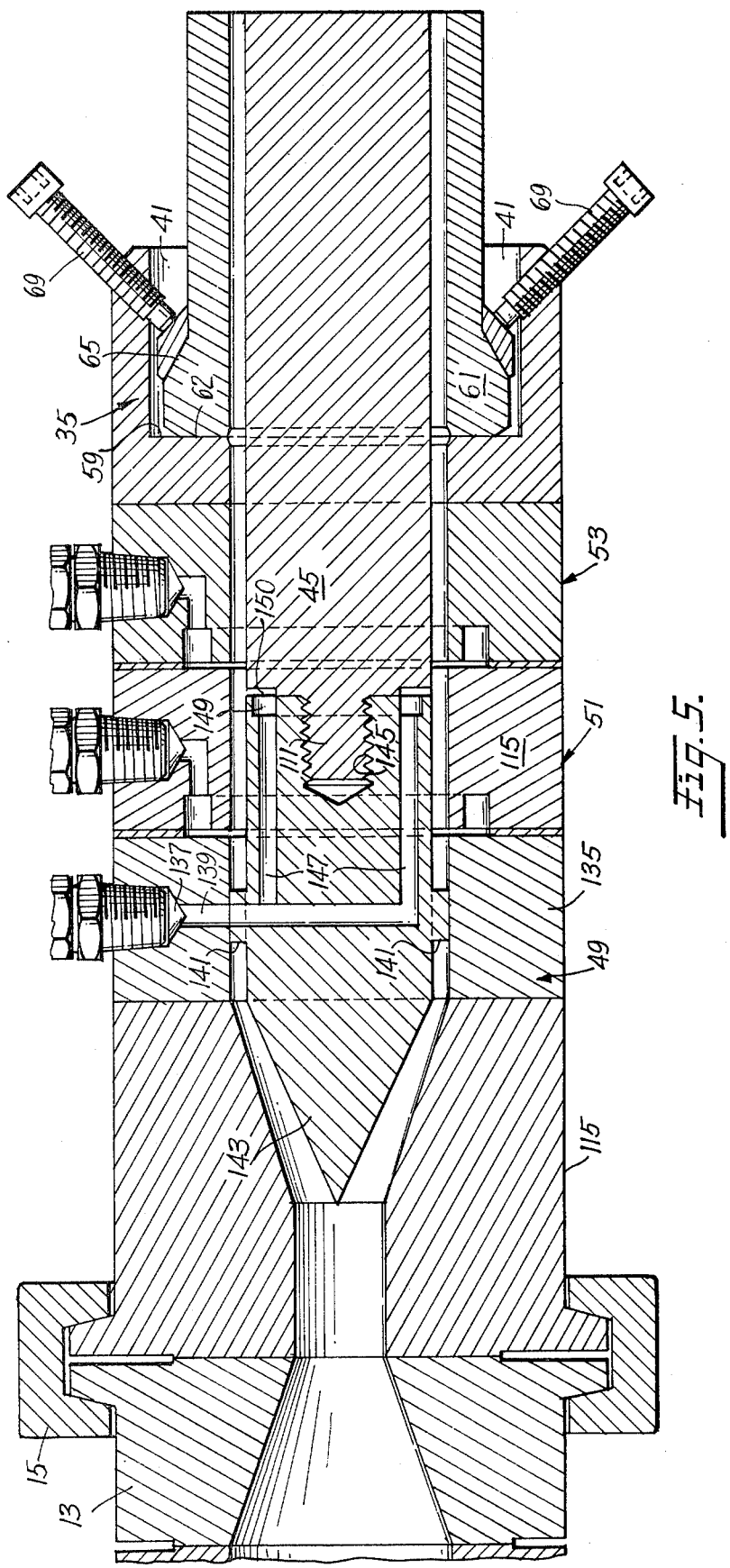

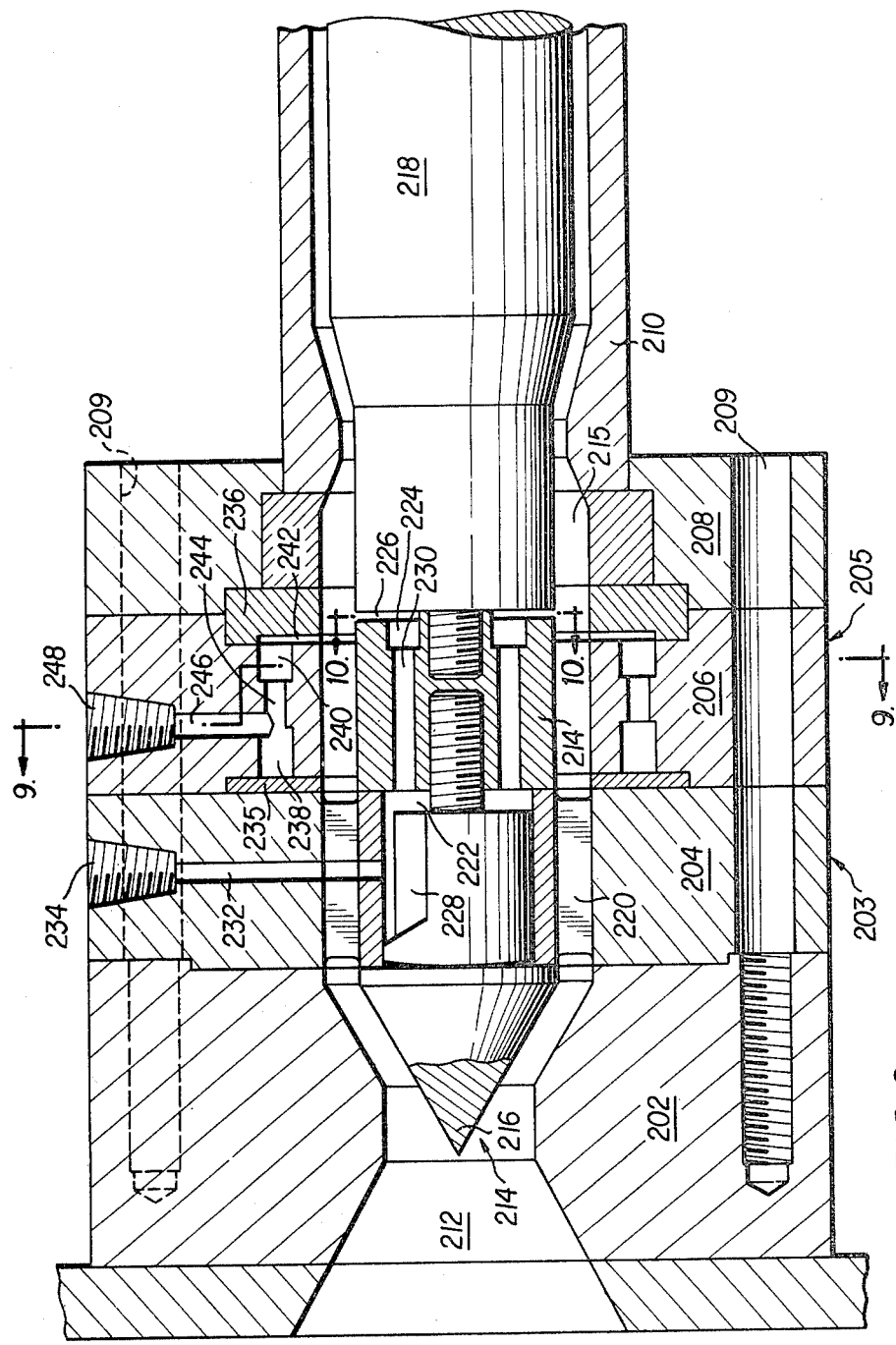

CO-EXTRUSION APPARATUS AND METHOD FOR PRODUCING MULTIPLE-LAYERED THERMOPLASTIC PIPE

CROSS-REFERENCE TO RELATED APPLICATIONS

The instant application is a divisional continuation-in-part application of co-pending application, Ser. No. 812,041, filed July 1, 1977 now abandoned.

BACKGROUND OF THE INVENTION

The present invention relates to multiple-layered pipe, preferably of two or more thermoplastic resins, and preferably having three layers comprising at least one outer layer, an intermediate core, and at least one inner layer, and a process and apparatus for the manufacture of such pipe. The present invention is particularly useful for producing pipe having an intermediate core of expanded thermoplastic resin.

Many attempts have been made to produce a multiple layered pipe in order to combine the desirable characteristics of different thermoplastic resins. These attempts have usually involved extruding several streams of thermoplastic resins through a series of concentric tubes which are fixed relative to one another in a radial manner, such as by spiders, to define annular passages therebetween, and then subsequently joining the resultant annular layers to produce a multiple-layered pipe. Pipes prepared by such processes and apparatus, however, have had spider marks thereon due to the flow interruptions caused by the many spiders necessitated in such apparatus. Moreover, such apparatus contain adjusting screws which protrude into the individual die passages for adjusting the thickness of the annular layers. These screws also interfere with the flow of the molten resin as it is being extruded, whereby additional marks have been developed upon the pipe.

Furthermore, it is undesirable to provide an extrusion die for each layer of the desired pipe. Since high internal pressure is required for the extrusion of the highly viscous heat plastified thermoplastic material, such apparatus are subject to distortions in the die which cause undesirable nonuniformity in the thickness of each layer, unless the extrusion pressures of each layer are balanced. However, in practice, it is frequently difficult to maintain extrusion pressures constant in their proper relationship. Those types of apparatus employing a separate die for each layer thus inherently involve difficulty in controlling the thickness of each layer in the desired pipe.

Another disadvantage associated with prior art apparatus for the production of co-extruded plastic pipe is the inability of the prior art apparatus to equalize the flow of thermoplastic within the die so that the heat plastified thermoplastic is applied as a continuous layer of constant thickness. This problem is particularly prevalent in those apparatus in which layers of thermoplastic are extruded through radial orifices. In order to form a layer of constant thickness, it is absolutely essential in such apparatus that the flow of thermoplastic through the orifice is constant along its entire circumference.

In the extrusion of multiple-layered pipe having an intermediate core of expanded thermoplastic material, this inability to form uniform layers of thermoplastic becomes even more objectionable. In order to produce a thermoplastic pipe with an expanded core which possesses high mechanical strength, it is absolutely necessary that each layer has a constant thickness. Failure to achieve very precise uniformity of thickness of each layer in expanded pipe, results in a product which has inferior physical properties.

In U.S. Pat. No. 3,223,761 is disclosed a process and apparatus for producing multiple-layered plastic tubing without a separate die for each layer of tubing. Several streams of the desired thermoplastic are fed to a multi-ported laydown which produces a composite multiple-layered cylindrical stream. This stream is then transported to an annular die having a mandrel which forms the cylindrical stream into an annular stream. However, in order to maintain layer uniformity of thickness, it is necessary that the extrusion process occur under objectionally high pressure conditions and with a velocity below the threshold of turbulent flow to preserve laminar flow conditions. Such apparatus and process are limited, however, to the extrusion of a three-layered pipe of only two different materials. For the extrusion of pipe containing more than two thermoplastic resins, a plurality of extruders having tapered nozzles are selectively positioned within the cylindrical stream to form a core of a new thermoplastic material. These extruders interfere with the melt flow, yielding a pipe with manufacturing imperfections. To maintain uniformity of layer thickness in this prior art apparatus, it is furthermore essential that the very precise process conditions described above be maintained, a difficult fact to accomplish in practice.

U.S. Pat. Nos. 3,447,204, 3,819,792, and 4,061,461 disclose die apparatus for producing a multiple-layered tube without employing the die-within-the-die concept. Such apparatus is limited, however, to the production of only two layered structures. Moreover, with such apparatus the flow of thermoplastic through the extrusion passageways is not balanced, precluding thereby the formation of layers of uniform thickness.

As has been stated above, the disadvantages associated with the above processes and apparatus are particularly acute in the production of multiple-layered thermoplastic pipe with an intermediate core of expanded thermoplastic material. The smaller amount of expensive thermoplastic resin in the core region, and the decrease in weight associated therewith, has made expanded pipe very attractive. Accordingly, it was proposed in U.S. Pat. No. 3,782,870 to produce a thermoplastic multiple-layered pipe with an intermediate core of expanded material. Such prior art expanded pipe has been marked, however, by prohibitatively low mechanical strength, low resistance to shock, high brittleness, and generally to be of inferior quality to non-expanded thermoplastic pipe. Moreover, such pipe has been manufactured from only a single thermoplastic resin and thus possesses inferior characteristics when compared to non-expanded pipe combining the desirable properties of several thermoplastic resins.

One attempt to produce a multiple-layered pipe having an intermediate expanded core without a separate die for each layer is disclosed in U.S. Pat. No. 3,299,192 in which a multiple-layered tube is formed by extruding a stream of thermoplastic containing a blowing agent, converting the stream into an annular stream, and then forming inner and outer skins thereon by quench chilling the annular stream. Necessarily, such a method is limited to the manufacture of pipe from only a single thermoplastic resin. Pipe produced by this method, therefore, exhibits the inferior physical characteristics associated with expanded pipe manufactured from only a single thermoplastic material.

The above-noted physical defects associated with prior art expanded pipe can be attributed to a failure in the prior art to develop a process and apparatus which can effectively control to very precise tolerances the uniformity of thickness of each layer. The inability of the prior art to control precisely layer thickness can be further attributed to the inability to produce plastic flow equalization throughout the narrow flow passages within a die. The inability of the prior art to produce a practicable expanded pipe is indicative, more generally, of the inability of the prior art to produce multiple-layered pipe of at least two thermoplastic resins with a uniform and desired thickness for each layer.

It would be desirable, therefore, if an apparatus and process for the production of multiple-layered pipe were available which could attain very precise control of layer thickness and flow equalization of the thermoplastic throughout the narrow extrusion passages of the die.

SUMMARY OF THE INVENTION

It is an object of the present invention, therefore, to produce a die apparatus for the production of multiple-layered pipe, preferably of at least two thermoplastic resins, which does not employ a separate die passage for each layer of resin.

It is a further object of the present invention to provide a process for the production of high quality multiple-layered pipe, preferably of at least two thermoplastic resins.

Still another object of the instant invention is to provide a modular pipe die capable of producing extruded thermoplastic pipe having from two to five layers.

It is another object of the present invention to provide a balanced flow die apparatus wherein the flow of thermoplastic is maintained at a constant value over the entire area of an extrusion passage.

It is yet another object of the present invention to provide a die apparatus which can control the thickness of each layer uniformly with a low percentage deviation.

It is still another object of the present invention to provide a die apparatus which enables various types of thermoplastic resins to be used for extruding a multilayer pipe therefrom.

A further object of the present invention is to provide a multiple-layered pipe having an intermediate core of expanded thermoplastic resin.

Yet another object of the present invention is to provide such expanded pipe combining the desirable characteristics of several thermoplastic resins.

An additional object of the present invention is to provide expanded multiple-layered pipe having a high mechanical strength, high shock resistance, low weight, and large savings of thermoplastic resin.

It is a further object of the present invention to provide a process for the production of non-expanded pipe having high mechanical strength, high shock resistance, low weight, and large savings of thermoplastic resin.

A specific object of the present invention is the provision of a balanced flow die apparatus in which layers of thermoplastic can be applied in a uniform manner.

The foregoing objectives are achieved according to the instant invention through the provision of a modular die apparatus and a process which enable multiple-layered pipe, having from two to five layers and combining the desirable characteristics of several thermoplastic resins, to be produced, and concomitantly which enable the production of pipe which has uniform layer thickness, which is not marked by manufacturing imperfections, and which has high mechanical strength. It has been found that pipe with the aforementioned desirable characteristics may be produced, according to the instant invention, through the use of a modular die apparatus which eliminates the separate die for each layer concept. Since apparatus employing this concept is subject to die distortions which produce non-uniformity of layer thickness, high uniformity of layer thickness can be achieved by utilizing an apparatus which employs only a single die passage. Moreover, it has been found that by providing flow equalizing means in each of the laydown means, flow of thermoplastic through the laydown orifices can be equalized, resulting in greater uniformity of layer thickness.

The modular die apparatus of the instant invention comprises a balanced-flow die apparatus having a main extrusion passageway with an annular cross-section for transporting a first annular stream of thermoplastic. At least one inner laydown means circumscribed by the main extrusion passageway is provided for applying a layer of thermoplastic to the inner surface of the first annular stream of thermoplastic. At least one outer laydown means circumferentially surrounding said main extrusion passageway is also provided for applying a layer of thermoplastic to the outer surface of the first annular stream of thermoplastic. Each of the inner and outer laydown means comprise an annular radial orifice which communicates with the main extrusion passageway, and an annular feed ring which supplies thermoplastic to the orifice. In a further, preferred embodiment of the instant invention, each of the inner and outer laydowns further comprises means for equalizing the flow of thermoplastic to a uniform value over the entire circumference of the orifices.

As has been stated above, the present invention is particularly applicable to the manufacture of a multiple-layered thermoplastic pipe having an intermediate expanded core. Accordingly, the present invention also contemplates a process for the preparation of such pipe which comprises forming in an extrusion apparatus a first cylindrical solid stream of a thermoplastic resinous material containing a blowing agent; converting the cylindrical stream into n annular stream by axially piercing and radially distributing the cylindrical stream; applying at least one inner annular layer to the annular stream from a second stream of thermoplastic resinous material; applying at least one outer annular layer to the annular stream from a third stream of thermoplastic material, thereby producing a multiple-layered annular stream; and extruding the multiple-layered annular stream through an annular die orifice to from a pipe. As a further embodimet, the die is heated during the extrusion step to produce pipe with a high gloss. Additionally, the thus formed pipe may be vacuum sized to produce the final pipe product.

A two-layered expanded pipe may also be produced in a variation of the above process. In this process, a cylindrical solid first stream of a heat plastified thermoplastic resinous material, containing a blowing agent, is formed in an extrusion apparatus, and subsequently converted into an annular stream by axially piercing and radially distributing the stream. At least one annular layer of a second stream of heat plastified thermoplastic resinous material is then applied along the outer circumference of the annular stream, thereby producing a multiple-layered annular stream having an inner expanded layer. The multiple-layered annular stream is then extruded through an annular die orifice to form a pipe. Optionally, the die may akso be heated during the extrusion step to produce a pipe with a high gloss thereon, and/or it may also be vacuum sized to form a final pipe product.

It is also contemplated by the present invention to provide a multiple-layered pipe having an expanded core which combines the desirable characteristics of at least two different thermoplastic materials. This pipe comprises at least one outer layer of a first thermoplastic resinous material, an intermediate core of expanded thermoplastic resinous material, and at least one inner layer of a second thermoplastic resinous material. In a preferred embodiment, the first thermoplastic is selected for external appearance and weatherability properties, one example being ABS. As used herein, the term "ABS" refers to the many copolymers of styrene, butadiene, and acrylonitrile well known to those skilled in the art. The expanded core my be of any suitable thermoplastic compatible with the thermoplastics of the inner and outer layers. Preferably, however, it is an inexpensive or even a scrap polymer. The second thermoplastic resin is preferably chemically resistant, such as for examples ABS.

The instant invention is also advantageous for the production of a five-layered expanded thermoplastic pipe. In this embodiment, the pipe comprises a core of expanded thermoplastic, two outer layers of thermoplastic material, and two inner layers of a different thermoplastic material. The expanded core may be of any suitable thermoplastic, but preferably is made from an inexpensive or scrap polymer. The first outer layer may again be of a suitable thermoplastic, or it may be a thermoplastic adhesive. The second outer layer is formed by a thermoplastic selected for external appearance properties and weatherability, such as ABS. The first inner layer may be any suitable thermoplastic, or it may also be an adhesive. The second inner layer is preferably formed of a chemically resistant thermoplastic, such as ABS.

While the instant apparatus and process has been described as being particularly applicable to the production of expanded multiple-layered pipe, it is equally applicable to the production of non-expanded pipe, due to its ability to produce a pipe having high uniformity of layer thickness without spider marks or other imperfections. In the preparation of this type of pipe, the same apparatus and processes may be utilized; however blowing agent is deleted from the streams of thermoplastic material to be extruded.

Various other objects, features, and attendant advantages of this invention will be more fully appreciated from the following detailed description when considered in connection with the accompanying drawings.

BRIEF DESCRIPTION OF THE DRAWINGS

FIG. 5 is an enlarged longitudinal sectional view through an alternative embodiment of the die apparatus of the instant invention, shown employing a one-layer applying spider assembly;

FIG. 6 is a sectional view of the thermoplastic pipe produced according to the present invention;

FIG. 7 is an enlarged sectional view similar to FIG. 6 of a modified form of the thermoplastic pipe.

FIG. 8 is a longitudinal section of a pipe die in accordance with a further embodiment of the instant invention wherein flow equalizing means are disposed in each of the inner and outer laydown means;

DETAILED DESCRIPTION OF THE PREFERRED EMBODIMENTS

Figure 1:
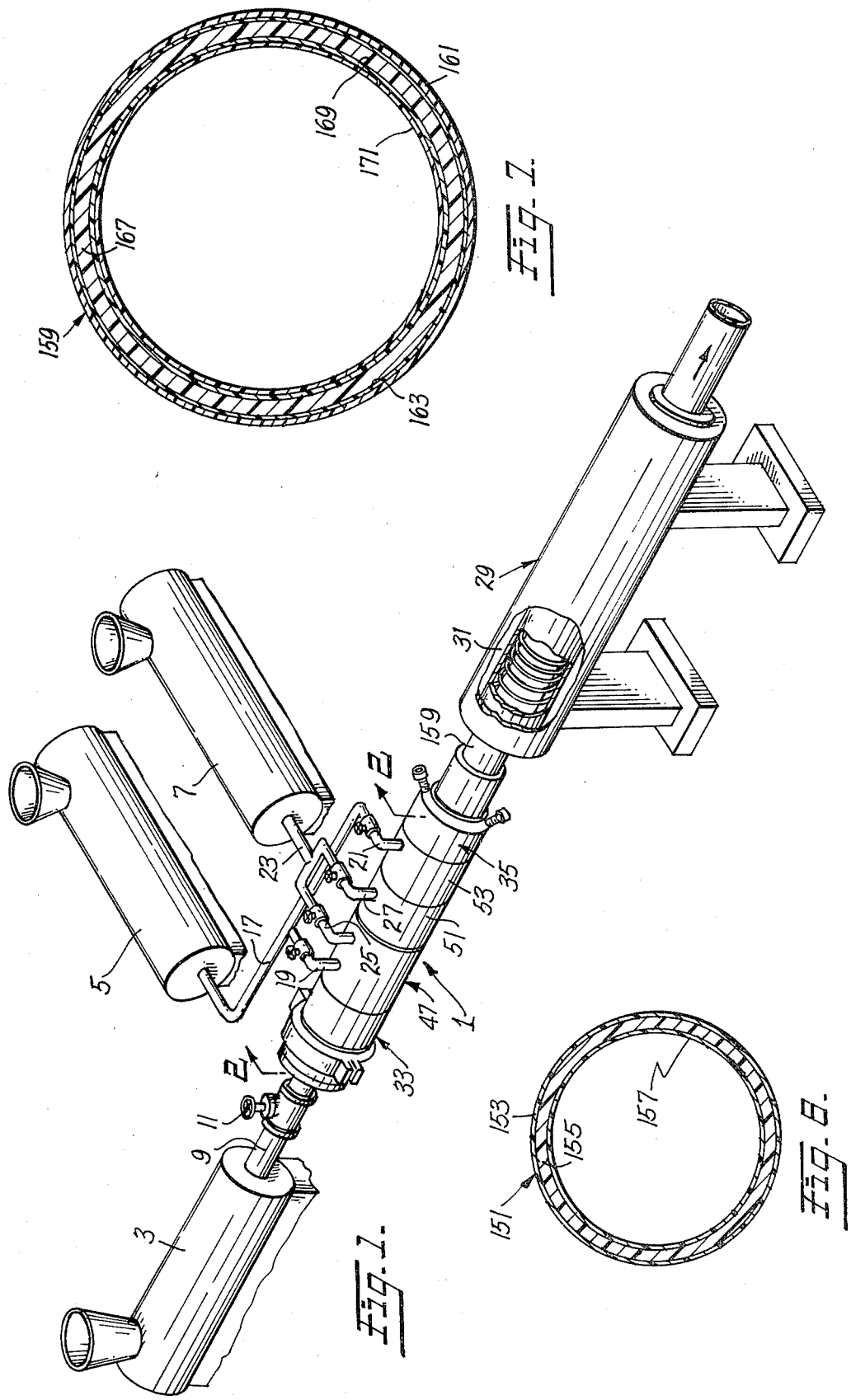
FIG. 1 is an isometric diagrammatic representation of the various stages of the coextrusion process of the present invention, showing the attachment of the extruders and vacuum sizer in relation to a coextrusion die according to the instant invention adapted for the formation of a five-layer pipe.

In its preferred embodiment, the apparatus of the instant invention comprises a modular pipe die with inner and outer laydown means. With the installation of additional laydowns, pipe structures having from two to five layers can be produced. Broadly, the die comprises a multiple piece die body having a first section containing a die mouth and an end section containing a die inlet, and having a central longitudinal passage therethrough defining a main extrusion passage through the die. The inner laydown means comprises a set of interchangeable spider assemblies each having the capacity for applying a different number of inner layers. In one embodiment, the instant invention provides a spider assembly having means for applying one inner layer to a stream of thermoplastic. In another embodiment, a spider assembly capable of applying two inner layers is employed in order to form a five-layered pipe product. Each of the spider assemblies are manufactured to be interposed between the die body first and end sections, and has a body portion with a central longitudinal passage therethrough, and a cylindrical mandrel portion disposed within the spider body passage in spaced relation therewith to define the main extrusion passage. The mandrel is provided with a tapered head for converting a cylindrical solid stream of thermoplastic into an annular stream. The inner layer applying means are also disposed within the mandrel. This means comprises at least one annular feed ring terminating in a radial orifice for applying at least one layer of thermoplastic resinous material to the inner surface of an annular stream flowing over the mandrel. A plurality of radial passages serve to position the mandrel within the spider body, and also contain feed conduits therethrough for feeding a stream of thermplastic resin under pressure to the annular feed ring.

To produce a pipe having more than one inner layer, a two-layer spider assembly is chosen which has two annular feed rings, each terminating in an annular radial orifice for applying a layer of thermoplastic material to the inner surface of an annular stream flowing over the mandrel. Each of these feed rings is supplied by its own feed conduit with thermoplastic material through the spider radial passages.

A longitudinal spindle is disposed within the die body flow passage in spaced relation therewith and is secured to said mandrel in an end-to-end relationship to define a continuous extrusion passage. Interposed between the die body first and end sections, downstream of the spider, and circumscribing the die mandrel is the means for applying the outer layers. This means comprises at least one laydown plate which has a central longitudinal passage aligned with the die body flow passage, and an annular feed ring which circumscribes the central passage of the laydown plate. A port supplies thermoplastic under pressure to the feed ring. An annular radial orifice communicates with the feed ring to feed an annular layer of thermoplastic to the extrusion passage defined by the mandrel and the laydown plate body. For the extrusion of more than one outer layer, a plurality of laydown plates are secured in an end-to-end relationship in interposition between the die body first and end sections, each laydown plate forming one outer layer of the resulting pipe.

In the preferred embodiment, each of the inner and outer laydown means preferably further comprises means for equalizing the flow of thermoplastic such that thermoplastic flows through each orifice in a uniform manner over its entire circumference. This means preferably comprises a pressure balanced annular reservoir chamber which is connected to the annular feed rings of each of the laydowns. In the preferred embodiment the pressure balanced annular reservoir chamber comprises an annular chamber which is connected to the annular feed rings by a plurality of selectively spaced feed ports.

Disposed within the die mouth in an end-to-end relationship is a spindle sleeve which has a smooth face which abuts a similar smooth face in the die mouth. The spindle sleeve surrounds the spindle in a spaced relation, defining a portion of the annular extrusion passage. The mandrel sleeve is movably secured within the die mouth and is adapted to undergo eccentric movement around said mandrel, for adjusting the concentricity of the pipe.

Referring now to the drawings, FIG. 1 illustrates an embodiment of the instant invention adapted for the manufacture of five-layered thermoplastic pipe. The die apparatus, generally indicated at 1, comprises a two-piece die body, a first die body section 33 and an end die body section 35. Interposed between the die body sections 33 and 35, is a spider assembly 47 for applying two inner layers to a stream of thermoplastic. Downstream from the spider assembly, is the outer layer applying means, laydown plates 51 and 53. The thermoplastic resin which subsequently forms the core layer of the finished pipe is separately kneaded by the extruder 3, and is extruded through feed pipe 9 and control valve 11 into the die 1. Extruder 5 provides the thermoplastic resin for forming one outer layer and one inner layer of the finished pipe, feed pipe 17 feeding a supply of the resin through the feed conduit 19 to the spider assembly 47, and through the feed conduit 21 to the laydown plate 53. Extruder 7 provides the thermoplastic resin forming he inner and outer layers adjacent the core layer through feedline 23 and feed conduits 25 and 27 to the spider assembly 47 and first laydown plate 51. Valve 11 on feed line 9, and the control valves on feed conduits 19, 25, 27, and 21 provide an independent adjustment to obtain pressure equalization between each of the feed lines. Adjustment of the thickness of the various layers is achieved without the use of interfering screws, by varying the relative extrusion velocities of each of the extruders 3, 5, and 7. The instant apparatus therefore permits independent layer thickness adjustment without the use of interfering adjustment screws.

Also shown in FIG. 1 is a vacuum sizer 29 which preferably is utilized in conjunction with the die apparatus of the instant invention. The vacuum sizer 29 is constructed to contain in approximately the first half of its length, a sizing die 31 in which the extruded pipe passes immediately after its exit from the extrusion die 1. The sizing die 31 functions to adjust the extruded pipe to its finished size. For an expanded pipe product, the finished product size will generally be approximately equal to that of the extruded product. However, for a solid pipe, the sizing die 31 reduces the pipe size slightly to its finished dimension.

The latter half of the vacuum sizer 29 is constituted by a cooling chamber, not shown, also maintained under vacuum. In this chamber, the final extruded and now sized pipe is cooled as nearly as possible to ambient temperature in order to further solidify the thermoplastic materials of each of the layers of the pipe. Cooling is suitably achieved by contacting the extruded article with a fine spray of cooling water. Alternatively, cooling may be achieved by immersing the pipe in a water bath.

Figure 2:
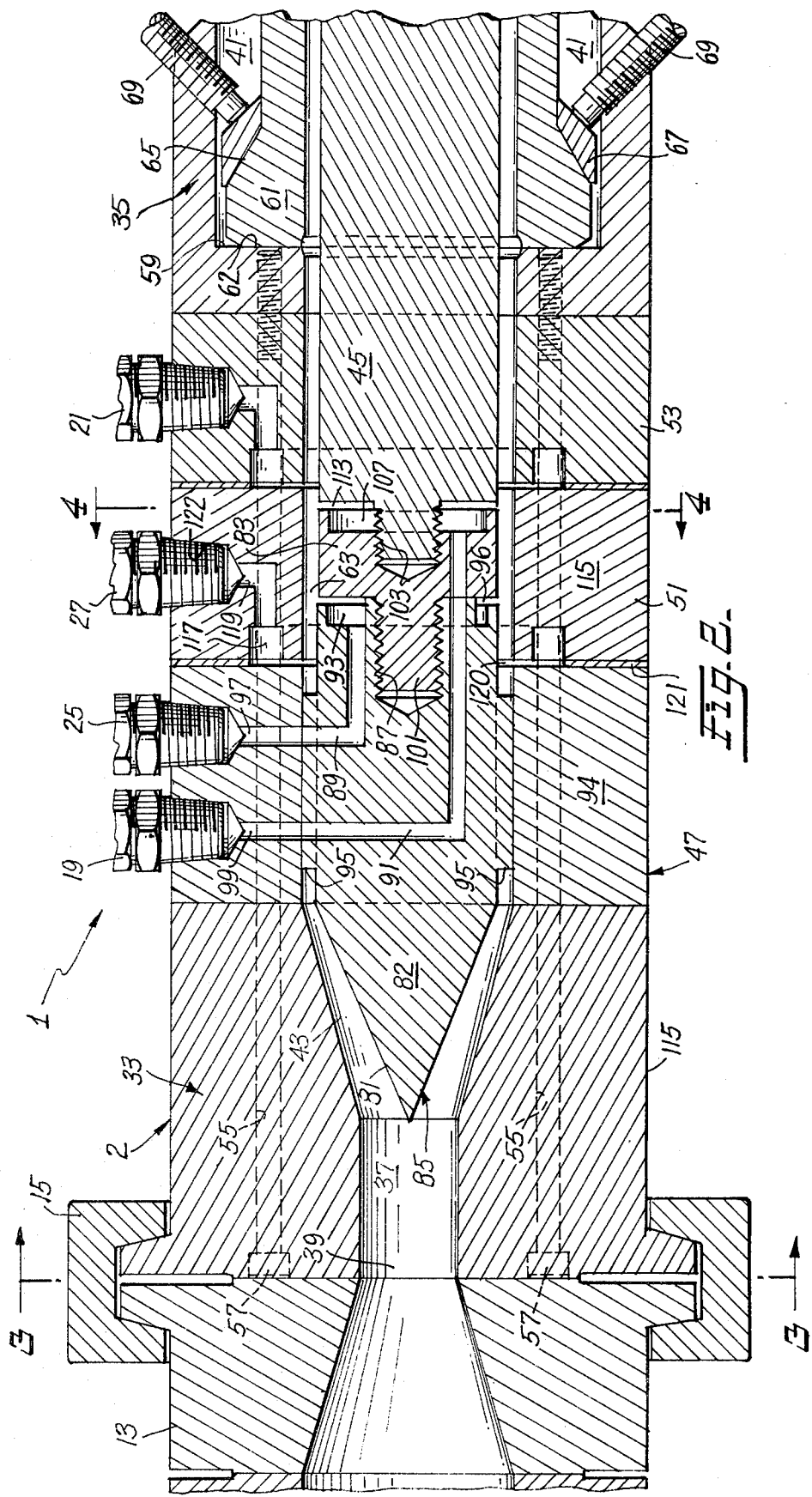
FIG. 2 is an enlarged longitudinal section through the die body, the spider assembly, and the outer laydown plate of the pipe die shown in FIG. 1.

FIG. 2 illustrates one embodiment of the die apparatus of the instant invention, adapted for the manufacture of a five-layer pipe. The die body 2, as has been aforementioned, is a multiple piece structure, comprising first die body section 33 and end die body section 35. Each of these sections has a central longitudinal passage 37 extending therethrough which defines the plastic flow space through the die. Passage 37 includes an inlet 39 on the first die body section 33, and terminates in a die mouth 41 on the end die body section 35. In the preferred embodiment, the passage 37 diverges downstream of the inlet 39 to form a passage of larger radius 43.

Interposed between the two die body sections 33 and 35 is the inner laydown means. This means comprises a set of interchangeable spider assemblies, each of which has the capacity for applying a different number of inner layers to a stream of thermoplastic. FIG. 2 illustrates the use of a spider assembly having the capacity for applying two inner layers, generally indicated at 47 and hereinafter referred to as a two-layer spider assembly. The two-layer spider assembly 47, shown in FIG. 2, comprises a body portion 94 having a mandrel supported therein, generally indicated at 85. The body portion 94 has a set of longitudinal bores 55 extending therethrough for securing the spider assembly in an end-to-end relationship with the first die body section 33 by means of screws 57. The body portion 94 also contains a central longitudinal passage which form a continuation of the die body central passage 37. The mandrel is equidistantly positioned within this passage by means of radial members 95, defining with the body portion 94 a pipe-forming or extrusion passage 63.

The mandrel 85 performs two functions. Firstly, it includes a tapered head 81 for converting a cylindrical stream of thermoplastic into an annular stream by axially piercing and radially separating a solid cylindrical stream of thermoplastic flowing through the die body central passage 37. This tapered head 81 extends into the diverging portion 43 of the central passage 37 to facilitate the formation of the annular stream. The annular stream of thermoplastic formed therein subsequently will become the core layer of the finished thermoplastic pipe product.

A second function which the spider mandrel 85 performs is the application of at least one inner layer of thermoplastic to the cylindrical stream flowing over the mandrel 85 through the extrusion passage 63. To this end, the mandrel 85 has disposed therein at least one means for applying at least one annular layer of thermoplastic to the inner circumference of the annular thermoplastic stream flowing thereover. This means comprises at least one annular feed ring disposed within the mandrel 85 which acts as a reservoir for a stream of thermoplastic which is to be subsequently applied as an inner layer to an annular stream of thermoplastic flowing over the mandrel, and an annular radial orifice connecting the feed ring with the extrusion passage 63. FIG. 2 illustrates an embodiment of the instant invention wherein a spider assembly having the capacity for the formation of two inner layers is employed. Accordingly, the mandrel 85 has disposed therein a first feed ring 93 and a second feed ring 107. The feed ring 93 terminates in an orifice 96 which communicates with the extrusion passage 63. Similarly, feed ring 107 terminates in orifice 113, also communicating with extrusion passage 63. The first feed ring 93 applies a first inner layer of thermoplastic to an annular stream of thermoplastic flowing over the mandrel 85. The second feed ring 107 applies a second inner layer of thermoplastic and is located downstream from the first feed ring 93.

Figure 3:
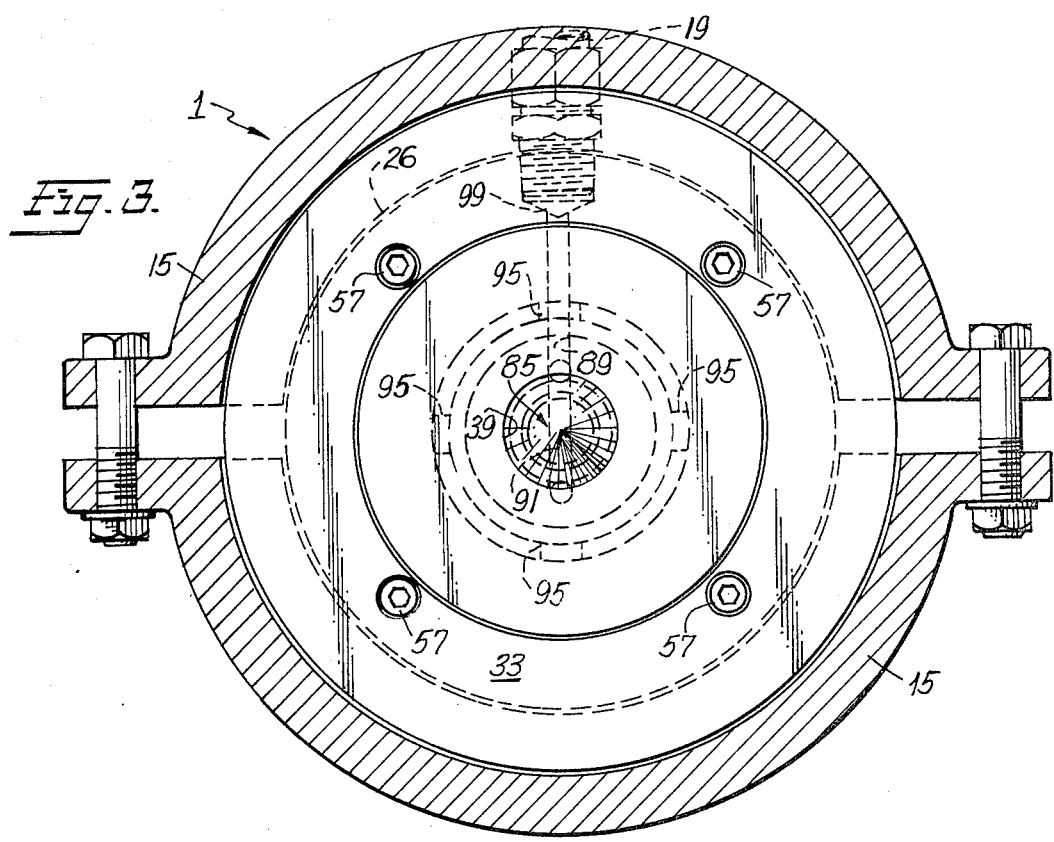
FIG. 3 is a transverse vertical sectional view through the clamping ring along the left end face of the die body first section taken on the line 3—3 of FIG. 2.
Figure 4:
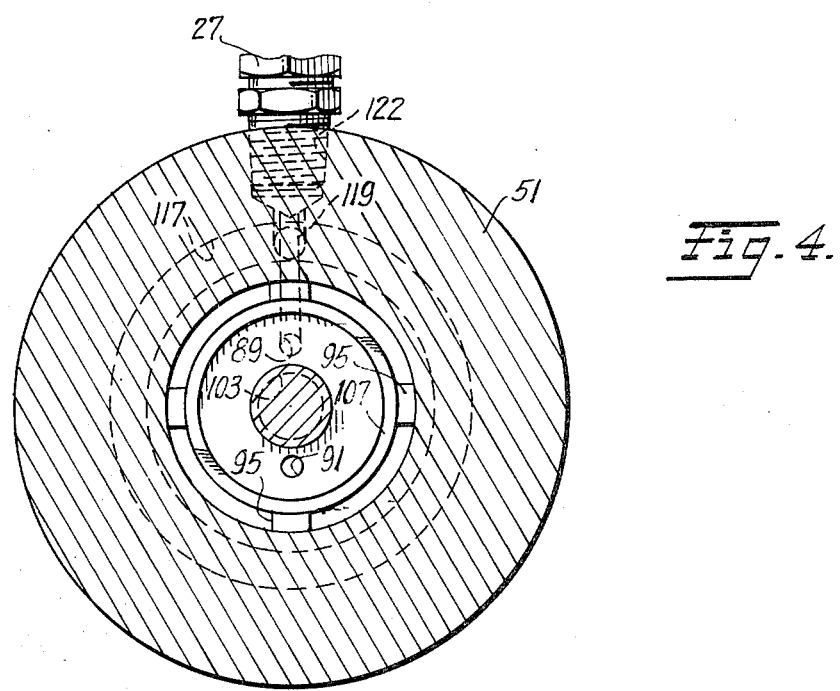
FIG. 4 is a fragmentary transverse vertical sectional view, taken on the line 4—4 of FIG. 2.

FIGS. 2, 3, and 4 illustrate the means for supplying each of the feed rings with a stream of molten thermoplastic under pressure. The body portion 94 (see FIG. 2) of the spider assembly 47 contains ports 97 and 99 which communicate with feed lines from the extruders. The port 97 communicates with the feed ring 93 by means of feed passage 89 extending through the body portion 94, the radial member 95, and the mandrel 85. Similarly, port 99 communicates with feed ring 107 by means of feed passage 91.

The two feed rings 93 and 107 may be formed within the mandrel 85 by any suitable means. However, it is convenient to form the mandrel 85 in two sections to facilitate the formation of the feed rings 93 and 107 therein. Accordingly, the mandrel 85 comprises a first section 82 containing the tapered head 81 and a second section 83. The first section 82 includes a threaded socket 87 which receives a threaded head 101 on the second section 83. Along the end face of the first section 82, the first annular feed ring 93 and its attendant orifice 96 may be conveniently milled. The left end face of the second section 83 of the mandrel 85 is then employed to define the final wall of the feed ring 93. The second mandrel section 83 also includes a threaded socket 103 for receiving the threaded head of the spindle 45. The second feed ring 107 may then be conveniently milled along the right end face of the second mandrel section 83. The left end face of the spindle 45 completes the feed ring 107 and orifice 113.

FIG. 5 illustrates an embodiment of the die apparatus according to the instant invention in which a one layer spider assembly 49 is interchanged with the two layer spider assembly 47. The one layer spider assembly 49 includes a body portion 135 and a single mandrel section 143. The spider mandrel section 143 has a tapered head thereon for converting a solid cylindrical stream of thermoplastic into an annular stream. A plurality of radial members 141 also serve to equidistantly space the spider mandrel 143 within the central longitudinal passage of the body portion 135. The mandrel 143 also contains a threaded socket 145 which receives the threaded head 111 of spindle 45. A single annular feed ring 149 is formed along the right end face of the mandrel section 143 by milling. The single feed ring 149 communicates with orifice 150, defined by the point of intersection of the mandrel 143 and the spindle 45. A stream of molten thermoplastic is suitably conveyed to the feed ring 149 hrough port 137, radial feed passage 139, and longitudinal feed passages 147.

The present invention thus provides a set of interchangeable spider assemblies which enable a thermoplastic pipe to be produced having one or two inner layers. It should be obvious to those skilled in the art, however, that by modifying the concepts of the instant invention, spider assemblies having the capacity of forming more than two inner layers can be provided. Similarly, by employing a spider assembly which does not contain a feed ring and attendant orifice within the mandrel a thermoplastic pipe without an inner layer may be formed. This latter situation can also be suitably achieved by merely closing the control valve on the feed lines from the extruders.

Applicants have found that the use of spiders does not interfere with the plastic flow around the mandrel, thereby producing objectionable spider marks on the resultant pipe, when the thermoplastic stream is extruded under pressure for a sufficient length to allow the thermoplastic to recombine into a single continuous layer before issuance through the die orifice. Accordingly, by positioning the spider at a point early in the extrusion process before a multiple-layered annular stream is formed, and by providing a length of uninterrupted extrusion passage, objectionable spider marks can be obviated. Moreover, it has been discovered that greater uniformity of layer thickness can be achieved by a die apparatus and process which does not employ a separate die for each layer of pipe, such apparatus being inherently subject to distortions. Furthermore, by extruding thermoplastic in indentifiable annular layers, rather than extruding the thermoplastic as cylindrical streams which are subsequently converted to an annular stream, greater uniformity of layer thickness can be produced.

In a conventional apparatus, in which a mandrel converts a multiple-layered cylindrical stream into an annular stream, the process of radially distributing the thermoplastic material produces irregularity in layer thickness, particularly in the inner layers of a multiple-layered pipe. It is advantageous therefore to extrude the thermoplastic of the inner layer of layers as an annular stream rather than as a cylindrical stream. Accordingly, in the instant invention, the spider assemblies are positioned next to the first die body section 33, thereby eliminating any interruptions in the multiple-layered annular stream. Moreover, the spindle 45 is employed to provide a suitable length of extrusion passage, wherein the layers of bonded thermoplastic are allowed to stabilize before exiting the die. As has been aforementioned, the spindle 45 includes a threaded head 111 which is received in a threaded socket on either of the spider assemblies 47 or 49. The spider assemblies 47 and 49 thus serve another function, spacing the spindle 45 within the die body central passage 37. The spindle 45 and the end die body section 35 cooperate to define an extrusion passage which is a continuation of the spider die passage 63 which permits stabilization of the thermoplastic layers.

FIGS. 2 and 5 illustrate the means for applying outer layers to a stream of thermoplastic according to the present invention. This means comprises at least one outer laydown plate. FIGS. 2 and 5 illustrate the die apparatus of the instant invention with the use of two outer laydown plates 51 and 53. It should be obvious, of course, to those skilled in the art that a single laydown plate may be employed where only a single outer layer is desired, or a plurality of laydown plates may be employed where more than two outer layers are desired. Alternatively, the laydown plates may be entirely deleted from the die apparatus where no outer layers are desired. In still another embodiment, where no outer layers are desired, flow of thermoplastic to the outer laydowns may simply be stopped by closing off the appropriate feed ports. Each of the laydown plates are identical and interchangeable. Accordingly, the laydown plates will be described with reference to the first laydown plate 51 shown in FIGS. 2 and 5. The laydown plate 51 is interposed between the die body sections 33 and 35 downstream of the spider assembly 47 or 49. The laydown plate 51 comprises a body portion 115 which has a plurality of longitudinal bores 55 which receive bolts 57 for securing the laydown plate within the die apparatus in an end-to-end relationship. The laydown body 115 contains a longitudinal central passage which is a continuation of the die body central passage 37 and which, when laydown plate 51 is interposed between die body sections 33 and 35, is aligned therewith. The laydown body 115 circumscribes the mandrel sections 85 or 143, and spindle 45, and defines therewith a portion of the extrusion passage 63. Circumscribed about the extrusion passage 63 and disposed within the body of the laydown plate 51 is an annular feed ring 117. A port 122 is drilled in laydown plate 51 and terminates in feed passage 119 which supplies feed ring 117 with a stream of thermoplastic resin. Feed ring 117 terminates in an annular radial orifice 120 which discharges into extrusion passage 63. One wall of feed ring 117 and orifice 120 is defined by the abutting face of spider assembly 47 or 49 when laydown plate 51 is secured thereto. Interposed between laydown plate 51 and the spider assembly 47 or 49 is an annular gasket 121 which functions to ensure a positive seal between spider assembly 47 and laydown plate 51.

The present invention also contemplates that a multiple-layered pipe with more than one outer layer may be formed by employing a plurality of outer laydown plates 51 secured serially together, as shown in FIGS. 2 and 5. Each laydown plate will form an annulus of thermoplastic around an annular stream of thermoplastic flowing through the die passage 63, resulting in a pipe with a plurality of outer layers.

The thickness of each of the layers of the thermoplastic pipe produced according to the instant invention is controlled by varying the extrusion velocities on the extruders 3, 5 and 7. This feature eliminates the need for adjustment screws within the die passages, thereby obviating any interruptions in the thermoplastic material flow. Additionally, a second adjustment feature may also be provided by the use of spacers. The thickness of the outer layers may be adjusted by employing annular gaskets 121 of different thickness, thereby varying the width of the orifice 120. Similarly, a spacer ring may be seated on the threaded head of mandrel section 83 and spindle 45 to adjust the width of the orifices 96 and 113. However, in the preferred embodiments, the thickness of each layer is adjusted by variation in the extrusion velocities.

The die apparatus of the present invention also contains means for controlling the concentricity of a multiple-layered pipe produced therefrom. Disposed in the die mouth 41 of FIGS. 2 and 5 in an end-to-end relationship is a spindle sleeve 61 which has a smooth face 62 which abuts a similarly smooth face 59 in die mouth 41. Spindle sleeve 61 surrounds spindle 45 in a spaced relationship, defining a continuous uninterrupted annular extension of extrusion passage 63 of variable concentricity, and which is of sufficient length to stabilize the layers of bonded thermoplastic. Spindle sleeve 61 is adapted to undergo eccentric movement around spindle 45, thereby controlling the overall concentricity of a multiple-layered pipe produced from the present die apparatus. A collar 67 is seated on head 65 of spindle sleeve 61. Adjustment screws 69, extending through the die body section 35, act on collar 67, thereby adjustably securing spindle sleeve 61 in die mouth 41.

Figure 9:
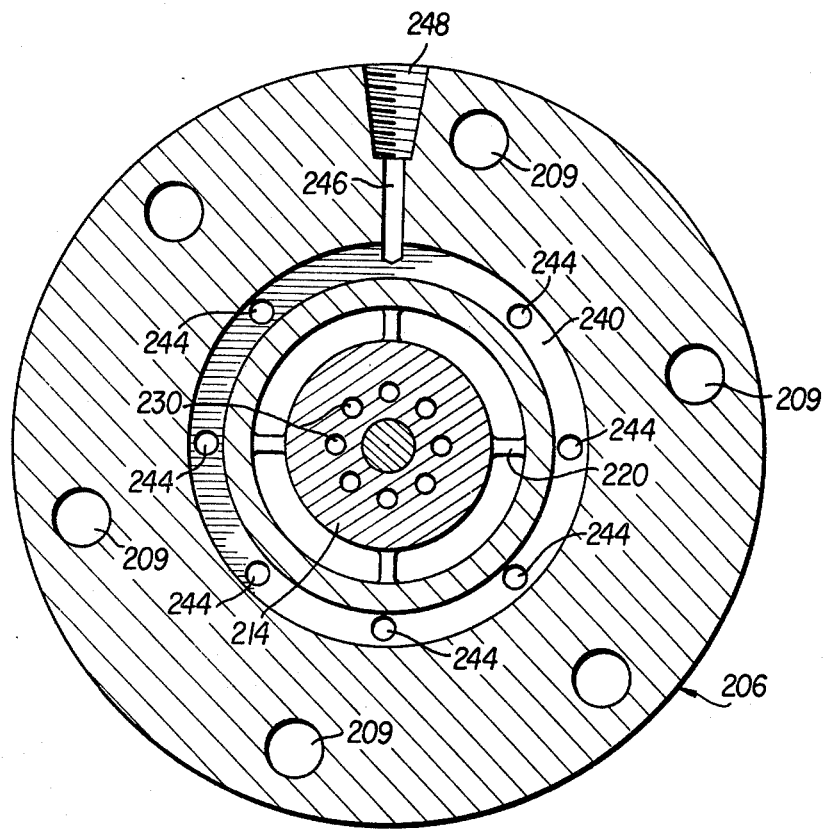
FIG. 9 is a fragmentary transverse vertical sectional view, taken along the line 9—9 of FIG. 8.
Figure 10:
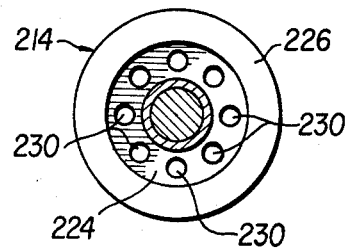
FIG. 10 is a fragmentary transverse vertical sectional view, taken along the line 10—10 of FIG. 8.

FIGS. 8–10 illustrate a preferred embodiment of the die apparatus of the instant invention, adapted for the production of the three-layered pipe, in which means are disposed within each of the inner and outer laydown means for equalizing the flow of thermoplastic over the entire circumference of the radial orifices used therein. Similar to the die apparatus of FIGS. 2 and 5, the apparatus of FIG. 8 comprises a multiple-piece die body, comprising first body section 202, containing a die inlet, and end body section 208. Interposed between the die body sections 202 and 208 are an inner laydown plate, generally indicated at 203, and an outer laydown plate, generaly indicated at 205. Each of the members 202, 203, 205 and 208 contain bores 209 therein, in which suitable screws may be inserted for securing the die together. The die body, comprised of the members 202, 203, 205, and 208 has a central longitudinal passage 212 therein which forms the central plastic flow space for the die.

The inner laydown plate or means 203 comprises a body portion 204 having radial protrusions 220 which extend into the passage 212 for supporting therein, in spaced relation therewith, the die mandrel; generally indicated at 214. The die body and mandrel 214 thus form therebetween the main extrusion passageway 215 of the die. Mandrel 214 is formed with a tapered head 216 to facilitate the radial separation of the main stream of thermoplastic flowing through passage 212 into a cylindrical stream of thermoplastic. To ease this process, passage 212 converges at the tapered tip 216 of mandrel 214. Secured to the mandrel 214 in end-to-end relationship is the spindle 218, which together with the eccentrically adjustable spindle sleeve 210 form an extension of the extrusion passage 215 of sufficient length to enable the bonded layers of thermoplastic to stabilize before exiting the die.

In order to apply an inner layer of thermoplastic to the annular stream flowing over the mandrel 214, the mandrel has an annular feed ring 224 disposed therein, which terminates in an annular radial orifice 226 communicating with the main extrusion passage 215. For supplying thermoplastic to the feed ring 224, the inner laydown body portion 204 is provided with a port 234 and radial passage 232 therein, passing through protrusion 220, which communicates with longitudinal feed passage 228 disposed in mandrel 214. In accordance with the inventive concepts of the instant invention, means are interposed between the longitudinal feed passage 228 and feed ring 224 for providing an equal flow of thermoplastic to all points on the circumference of the orifice 226.

Heretofore, with prior art devices not utilizing such means, the flow of thermoplastic through the orifice 226 has been greater at certain points thereof than at other points, due to a pressure imbalance in the feed ring 224. Applicants have found that this problem, which precludes the attainment of high uniformity of layer thickness, may be overcome by interposing a flow equalizing means between the longitudinal feed passage 228 and the feed ring 224. In the preferred embodiment, this flow equalizing means comprises a pressure-balanced annular reservoir chamber comprising annular chamber 222 and a plurality of selectively spaced feed ports connecting the chamber 222 to the feed ring 224.

The chamber 222 accumulates a balanced-pressure reservoir of thermoplastic. Flow of the thermoplastic therein to the feed ring 224 is regulated by the number and spacing of the ports 230 so as to provide an equal flow of thermoplastic to all points of the radial orifice 226. By thus equalizing the flow of thermoplastic over the entire circumference of the orifice 226, greater uniformity of layer thickness can be achieved. The number and spacing of the ports 230 is selected to provide an equal flow of thermoplastic at all points on the orifice 226. The exact number and spacing required will vary with the thermoplastic being extruded, the extrusion pressures, etc., and can easily be determined by experimentation by one skilled in the art. In the embodiment shown in FIG. 10, eight ports 230, spaced 45° apart, are provided, although it should be emphasized that any number and arrangement of ports may be selected in keeping with the concepts of the present invention. Moreover, it is also within the scope of the present invention to vary the size or shape of the ports 230 to achieve flow equalization through the orifice 226.

The inner laydown means may be formed by any method well known to those skilled in the art. Conveniently, as has been described in detail supra., this may be done by forming the mandrel 214 in sections, and milling the necessary ports, chambers, and passages along the end faces thereof.

The outer laydown plate 205 comprises body member 206 having disposed therein, circumferentially around the main extrusion passageway 215, the outer laydown means. This means comprises the annular feed ring 240 and connected annular radial orifice 242, which communicates with the extrusion passageway 215. Also provided in the body member 206 is a feed port 248, and a radial feed passage 246 for supplying thermoplastic to the orifice 242. Similar to the inner laydown means, the outer laydown body member 206 is provided with flow equalizing means connecting the feed passage 246 with feed ring 240. This means comprises a pessure-balanced reservoir chamber and is formed by the annular chamber 238 and the plurality of selectively spaced feed ports 244 connecting the chamber 238 to the feed ring 240. The chamber 238 and ports 244 function identically to the chamber 222 and ports 230 of the inner laydown means to balance the flow of thermoplastic over the entire area of the orifice 242. As seen in FIG. 9, seven feed ports are provided in the outer laydown body 206, with a spacing of 45°, starting from the radial feed passage 246. Of course, any other suitable number and spacing, as well as sized ports could be utilized. Through the use of such a flow equalization means, a uniform flow of thermoplastic is provided at all points on the orifice 242, enhancing thereby the application of an outer layer of uniform thickness.

As with the outer laydown plates which have heretofore been described, the plate 205 is formed by milling a solid metal block. Conveniently, this is done by milling the chamber 238 and feed ring 242 on each end face of the block, and then sealing off the faces with the sealing rings 235 and 236 to form the respective chambers.

While the use of the flow equalizing means of the instant invention has been described with reference to the three layer die of FIG. 8, it is to be emphasized that this concept may also be utilized, and in the preferred embodiment is utilized, with the apparatus of FIGS. 2 and 5, as well as with other apparatus such as would be obvious to those skilled in the art, after minor modification if necessary. By utilizing this concept, flow equalization may be easily achieved without extensive redesign work, etc., merely by adjusting the number, location, or size of the ports 230 and 244, thus accruing a significant operational advantage over conventional co-extrusion dies.

The apparatus and process of the present invention thus produces a multiple-layered pipe of at least two thermoplastic resins having very precise uniformity of layer thickness. The present apparatus is not subject to die distortions, nor does it produce spider marks on pipe extruded therefrom. Furthermore, by employing a die which applies only annular layers of thermoplastic to an annular stream of polymer flowing therethrough, each annular layer having its own adjustment means which eliminates the need for interfering adjustment screws, greater control over the uniformity of a multiple-layered pipe can be achieved than previously. The present apparatus is thus ideally suited to the production of thermoplastic multiple-layered pipe of two or more thermoplastic resins.

The apparatus and process described herein can be employed to produce a multiple-layered pipe with a wide range of thermoplastic materials, including all extrudable plastic materials. Examples of such materials include cellulose esters and ethers such as ethyl cellulose acetate, acetobutyrate, and acetopropionate; vinyl and vinylidene polymers and copolymers such as polymers and copolymers of vinyl chloride, vinyl acetate, vinylidene chloride, polyvinyl alcohol, polyvinyl butyral; and polymers and copolymers of acrylic and methacrylic esters; polymers and copolymers of olefins, such as ethylene, propylene, and butylene; polymers and copolymers of styrene, 2-methyl styrene and their mixtures of elastomeric copolymers; polyamides, interpolyamides such as polyhexamethylene adipamide, polycaproloctam, polyundecanamide, polyhexamethylenesebacamide; polycarbonates; polyaldehydes, polyethers; polyurethanes; polyesters; natural and synthetic elastomers; thermoplastic fluorinated resins; and silicon resins and elastomers. Preferably, however, the polystyrenes and its copolymers and elastomers are employed, such as polystyrene, styrene-acrylonitrile copolymers (SAN), styrene-butadiene-acrylonitrile-copolymers (ABS), and methacrylate-styrene-rubber copolymers.

These plastic materials can, of course, be used in admixture with fillers, plasticizers, colorants, or other ordinary additives, provided they are in a state permitting melt extrusion.

In the preferred embodiment, moreover, these plastics are combined to take advantage of the desirable properties of each thermoplastic. By way of example of desirable properties, there may be mentioned mechanical strength, resistance to shock, thermal properties, transparency, opacity, resistance to chemicals, impermeability to liquids, gases, and odors, ease of working, ability to receive printing or decoration, etc. Particularly preferred according to the present invention is a three layered pipe having an outer layer of ABS or an acrylic, preferably colored for identification and appearance purposes, an intermediate core of an inexpensive thermoplastic, such as polystyrene e.g. regrind, and an inner layer of ABS or methacrylate-styrene-rubber copolymer for chemical resistance.

It is also contemplated in the present invention that a multiple-layered pipe of thermoplastic may be made having layers of adhesive between each layer of thermoplastic. For example, a five-layered pipe could be made having mutually compatible resin interposed between adjoining layers of thermoplastic. In this way it is possible to form multiple-layer pipe products combining materials for their specific properties, irrespective of whether these materials are capable of being directly bonded to one another during co-extrusion.

In FIG. 6 is shown a multiple-layered thermoplastic pipe having an expanded intermediate core. FIG. 6 illustrates a three-layered pipe 151 according to the present invention which comprises an outer layer of thermoplastic 153, an intermediate core of expanded thermoplastic 155, and an inner layer of thermoplastic 157. While any of the extrudable thermoplastics listed above may be used in the expanded pipe of the present invention, outer layer 153 is preferably ABS or an acrylic, and inner layer 157 is preferably a chemically resistant thermoplastic of which ABS, and methacrylate-styrene-rubber copolymers are preferred. Any expandable thermoplastic may be used in expanded core 155, including inexpensive polymers, mixtures of scrap polymer, etc. Perferably, however, the core 155 is made of expanded polystyrene.

While the particular thermoplastic used in the core 155 is not crucial to the present invention, the density of this layer has been determined to be very crucial to the production of a high quality pipe having good mechanical strength and shock resistance. Accordingly, it has been found that addition of from 0.05% to 2.0% by weight of blowing agent to the particular thermoplastic chosen for core 155 gives the best results. Preferably, however, the thermoplastic contains approximately 0.1% by weight blowing agent. The use of this amount of blowing agent produces an expanded pipe having a mechanical strength substantially identical with non-expanded pipe, while reducing overall pipe weight 20-30% and lowering material costs 15-25%. In fact, an expanded co-extruded pipe designed according to ASTMD2751 specification for ABS sewer pipe and ASTMD2661 specification for ABS DWV pipe can meet or exceed impact strength requirements intended for solid ABS, even at 30% weight reduction.

Any blowing agent compatible with the particular thermoplastic polymer chosen for core 155 is suitable for use in the present invention, including solid, liquid, and gaseous blowing agents. Particularly useful in the present invention are the liquid hydrocarbon and chlorinated hydrocarbon blowing agents. Liquid blowing agents have the advantage of being easily admixed with a thermoplastic melt without requiring exceptionally high pressures to prevent premature expansion or foaming of the polymer. Also preferred are solid alkali and/or alkaline earth metal carbonate blowing agent systems. Typical blowing agents include sodium bicarbonate/citric acid systems, and the azodicarbonamide blowing agents manufactured under the trade names Kenpore 125 by Stepan Chemical Co., and Celogen AZ from Uniroyal Chemical, Nangatuck, Con.

The addition of 0.05% to 2.0% blowing agent by weight produces a pipe having a specific gravity from about 0.75 to 0.9. It has been found that the highest quality pipe has a specific gravity in this region. Preferably, though, a pipe with a specific gravity of about 0.85 is obtained by the addition of 0.1% blowing agent by weight. Pipe with a specific gravity of 0.85 provides the most savings of material and is light weight, while maintaining a mechanical strength and shock resistance comparable to non-expanded pipe.

As has been discussed supra., it is also contemplated according to the present invention that ordinary additives such as dyes, fillers, pigments, plasticizers, etc. can be added to the expanded thermoplastic pipe illustrated in FIG. 6.

FIG. 7 illustrates an alternative embodiment of the expanded pipe of the instant invention. A five-layered pipe 159 comprises an outer layer of thermoplastic 161, a second outer layer 163, intermediate expanded core 167, first inner layer 169, and second inner layer 171. Layers 161, 167, and 171 are preferably as described above in the embodiment shown in FIG. 6. Layers 163 and 169 may be any desired thermoplastic material. Preferably, though, layers 163 and 169 are formed of an adhesive.

Applicants have found that the above-described thermoplastic pipes may be advantageously produced according to the following process. While for the sake of illustration the process will be described in detail for the production of an expanded thermoplastic pipe of five layers, it is to be understood that the process of the present invention is equally applicable to the production of non-expanded pipe and pipe having a different number of layers. Referring to FIGS. 1 and 2, in a first step of the process, a first stream of thermoplastic containing blowing agent, and which ultimately constitutes the intermediate expanded core of pipe 159 is fed in a heat plastified condition by the extruder 3 through feed line 9, control valve 11, and adapter 13 to the die inlet 39. The solid cylindrical stream containing the blowing agent is then fed under pressure through the die central passage 37 over the tapered head 81 of the mandrel 85, whereupon the solid cylindrical stream is coverted into an annular stream.

The annular stream is then moved under pressure through the extrusion passage 63, and around and past the radial members 95. Concurrently, a second stream of thermoplastic is fed by extruder 5 through feed line 17 and feed conduit 19 to feed ring 93, where it is discharged through annular orifice 96, forming an annular inner layer along the inside surface of the annular stream, thereby producing a two-layered annular stream. A third stream of thermoplastic is then fed by extruder 7 through feed line 23 and feed conduit 25 into the second annular feed ring 107. This stream forms a second inner annulus of thermoplastic, thereby producing a three-layered annular stream.

As the three-layered stream is extruded through the extrusion passage 63, extruder 7 supplies a fourth stream of thermoplastic through feed line 23 and feed conduit 27 to the first laydown plate 51, which applies a first outer annulus of thermoplastic around the annular stream flowing therethrough, thereby producing a four-layered annular stream. The thermoplastic forming the outermost layer of the pipe is fed by extruder 5 through feed line 17 and feed conduit 21 to the second laydown plate 53, forming a five-layered annular stream.

The five-layered stream is then extruded through annular extrusion passage 63. The extrusion passage 63 is of sufficient length to stabilize the bonded layers of thermoplastic, generally a total length of about six inches being sufficient. In a preferred embodiment, moreover, the rear end of die body 2, including end section 35 and spindle 61, is heated to produce a high gloss upon the formed pipe 159 issuing from the extrusion passage 63. Preferably, the hot pipe issuing from the die 1 is then fed into vacuum sizer 29 wherein it achieves its final finished size and density. Cooling then completes the finished product.

Alternatively, a four-layered pipe product comprising two outer layers, an intermediate core, and one inner layer may be formed by the instant process. In this aspect of the instant invention, the die apparatus of FIG. 5 is employed, utilizing the one layer spider assembly 49 to apply a single inner layer of thermoplastic to the annular stream of thermoplastic flowing through extrusion passage 63. Similarly, a three-layer pipe may be employed using the die apparatus of FIG. 8.

Furthermore, the present invention also contemplates the production of a two-layered pipe. In this aspect of the instant invention, the die apparatus of the instant invention is employed with only a single laydown plate. Moreover, the control valves on the feed conduits 19 and 25 leading to the spider assembly 47 are closed.

This shuts off the flow of thermoplastic resin to the inner laydown means, thereby producing a pipe having an outer layer of thermoplastic, fed from a single laydown plate, and an inner layer of expanded thermoplastic fed through feed line 9 and extruder 3.

To produce a thermoplastic pipe having more than five layers, a desired thermoplastic is extruded under pressure through a spider assembly containing additional inner layer applying means, and through additional laydown plates to form additional inner and outer layers respectively.

Non-expanded pipe may be produced according to any of the above-described embodiments by deleting blowing agent from the thermoplastic which is extruded through feed line 9 by the extruder 3.

While the instant process is useful for the production of high quality thermoplastic pipe under any pressure and velocity conditions, the present process is particularly advantageous when a pressure of the order of 1000–3000 psi, preferably 2000 psi, a velocity of 500–3000 lb/hr., and an extrusion melt temperature of 350° to 475° is employed. Furthermore, a particularly high quality pipe is achieved by producing a pipe with a specific gravity between 0.65 to 1.00, with a specific gravity of about 0.85 being preferred. Such pipe can be produced with an expanded thermoplastic core containing from about 0.5% to 20% by weight blowing agent, with a blowing agent concentration of about 0.1% by weight being preferred.

The details and manner of practicing the invention are illustrated by the following non-limiting examples.

EXAMPLE 1

A three-layered expanded pipe, having an outside diameter of 2 inches and a wall average thickness of 0.187 inches is produced by providing by extrusion a heat plastified stream of polystyrene (at 375° C.) containing 0.1% by weight of a blowing agent comprised of a sodium bicarbonate/citric acid mixture, a second stream of heat plastified polystyrene at 400° C. containing 4% by weight brown pigment, and a third stream of heat plastified ABS at a temperature of 400° C. in a ratio of 10:80:10, respectively to the die of the present invention at a pressure of 2000 psi, and then extruding the resin streams through the pipe forming die described above. The pipe so produced exhibited a mechanical strength and shock resistance comparable to non-expanded pipe and contained no manufacturing imperfections.

EXAMPLE 2

A three-layered pipe is produced as in Example 1 with a methacrylate-styrene-rubber copolymer being substituted for the ABS. The product expanded pipe exhibits physical properties comparable to non-expanded pipe, and has a uniformity of layer thickness superior to conventional pipe.

While the invention has now been described in terms of various preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A balanced flow die apparatus for manufacturing multiple-layered thermoplastic pipe having different inner and outer layers, said apparatus comprising:
   a. a main extrusion passageway having an annular cross-section for transporting an annular stream of a first thermoplastic material;
   b. an inner laydown means circumscribed by said main extrusion passageway for applying a layer of a second thermoplastic material to the inner surface of said annular stream of said first thermoplastic material; and
   c. an outer laydown means disposed circumferentially about said main extrusion passageway for applying a layer of a third thermoplastic material to the outer surface of said annular stream of said first thermoplastic material;
   d. each of said inner and outer laydown means including an annular feed ring spaced radially from said extrusion passageway, an annular radial orifice communicating between said radially spaced feed ring and said main extrusion passageway, said feed ring supplying thermoplastic to said orifice, and a pressure balanced annular reservoir chamber connected to said annular feed ring for balancing the flow of thermoplastic through said orifice; said first, second and third thermoplastic materials each being different from each other, and said inner and outer laydown means forming distinct pathways for said second and third thermoplastic materials which do not communicate with each other.

2. A balanced flow die apparatus for manufacturing multiple-layered thermoplastic pipe, comprising:
   a. a main extrusion passageway leading to a die outlet and and having an annular cross-section for transporting a first annular stream of thermoplastic;
   b. an inner laydown means circumscribed by said main extrusion passageway for applying a layer of thermoplastic to the inner surface of said first annular stream of thermoplastic;

c. an outer laydown means disposed circumferentially about said main extrusion passageway for applying a layer of thermoplastic to the outer surface of said first annular stream of thermoplastic;

each of said inner and outer laydown means including an annular radial orifice communicating with said main extrusion passageway, an annular feed ring supplying thermoplastic to said orifice, and a pressure balanced annular reservoir chamber connected to said annular feed ring for balancing the flow of thermoplastic through said orifice; and d. a sleeve and a spindle secured to said die apparatus adjacent said die outlet in end-to-end relation with said annular extrusion passageway; said sleeve and spindle forming an extended extrusion passage wherein the layers of thermoplastic are stabilized before exiting the die.

3. The apparatus of claim 2, wherein said pressure balanced annular reservoir chamber comprises an annular chamber having a plurality of selectively spaced feed ports connecting said annular chamber to said annular feed rings.

4. The apparatus of claim 3, wherein the annular reservoir chamber of said outer laydown means circumscribes said main extrusion passageway.

5. The apparatus of claim 3, wherein said main extrusion passageway circumscribes the annular reservoir chamber of said inner laydown means.

6. The apparatus of claim 2, wherein said main extrusion passageway is formed by:
   a. a die body having a central longitudinal passage, one end of said die body defining a die inlet, and the opposite end defining a die outlet, said die body containing said outer laydown means; and
   b. a cylindrical mandrel disposed within the longitudinal passage of said die body in spaced relation therewith, said mandrel having a tapered head facing said die inlet for converting a cylindrical solid stream of thermoplastic into an annular stream, and having further said inner laydown means disposed therein.

7. The apparatus of claim 6, wherein said die body comprises:
   a. a first die body section containing said die inlet;
   b. an inner laydown plate having spider means connected to said mandrel for supporting said mandrel in the longitudinal passage of said die body;
   c. an outer laydown plate having said outer laydown means disposed therein; and
   d. an end die body section containing said die outlet.

8. The apparatus of claim 7, wherein said outer laydown means comprises:
   a. a radial orifice circumscribing and communicating with said main extrusion passageway;
   b. an annular feed ring circumscribing said main extrusion passageway which feeds thermoplastic to said orifice;
   c. a pressure balanced annular reservoir chamber disposed in said outer laydown plate which circumscribes said main extrusion passageway and is connected to said annular feed ring for balancing the flow of thermoplastic to said orifice; and
   d. a feed port for feeding thermoplastic under pressure to said pressure-balanced annular reservoir chamber.

9. The apparatus of claim 8, wherein said pressure balanced annular reservoir chamber comprises an annular chamber having a plurality of selectively spaced feed ports connecting said annular chamber to said annular feed rings.

10. The apparatus of claim 7, wherein said inner laydown plate includes a feed port passing through said spider means for supplying thermoplastic to said inner laydown means.

11. The apparatus of claim 10, wherein said inner laydown means comprises:
    a. a longitudinal feed passageway disposed in said mandrel which communicates with said inner laydown plate feed port;
    b. a radial orifice communicating with said main extrusion passageway;
    c. an annular feed ring feeding said orifice with thermoplastic; and
    d. a pressure-balanced annular reservoir chamber disposed within said mandrel and circumscribed by said main extrusion passageway, which is interposed between said longitudinal feed passageway and said annular feed ring for balancing the flow of thermoplastic to said orifice.

12. The apparatus of claim 11, wherein said pressure balanced annular reservoir chamber comprises an annular chamber having a plurality of selectively spaced feed ports connecting said annular chamber to said annular feed rings.

13. A balanced flow die apparatus for manufacturing multiple-layered thermoplastic pipe, comprising:
    a. a die body having a central longitudinal passage, one end of said die body defining a die inlet and the opposite end defining a die outlet;
    b. a cylindrical mandrel disposed within the longitudinal passage of said die body in spaced relationship therewith, said mandrel and said die body defining thereby a main extrusion passageway, and said mandrel having a tapered head facing said die inlet for converting a cylindrical solid stream of thermoplastic into an annular stream;
    c. an inner laydown means disposed within said mandrel for applying a layer of thermoplastic to the inner surface of said annular stream of thermoplastic;
    d. an outer laydown means disposed in said die body circumferentially about said main extrusion passageway for applying a layer of thermoplastic to the outer surface of said annular stream of thermoplastic, each of said inner and outer laydown means comprising an annular radial orifice communicating with said main extrusion passageway, an annular feed ring supplying thermoplastic to said orifice, and a pressurebalanced annular reservoir chamber connected to said annular feed ring for balancing the flow of thermoplastic through said orifice;
    e. means for feeding thermoplastic to each of said inner and outer laydown means; and
    f. a sleeve secured within said die body outlet and a spindle secured to said mandrel in end-to-end relation therewith; said sleeve and spindle forming an extended extrusion passageway wherein the layers of thermoplastic are stabilized before exiting the die.

14. The apparatus of claim 13, wherein said pressure balanced annular reservoir comprises an annular chamber having a plurality of selectively spaced feed ports connecting said annular chamber to said annular feed rings.

15. The apparatus of claim 14, wherein said die body comprises:
 a. a first die body section containing said die inlet;
 b. an inner laydown plate having spider means connected to said mandrel for supporting said mandrel in the longitudinal passage of said die body;
 c. an outer laydown plate having said outer laydown means disposed therein; and
 d. an end die body section containing said die outlet.

16. The apparatus of claim 15, wherein said means for feeding thermoplastic to said inner laydown means comprises a longitudinal feed passageway disposed in said mandrel which communicates with said pressure-balanced annular reservoir chamber; and a feed port passing through the spider means of said inner laydown plate which is connected to said mandrel longitudinal feed passageway.

17. The apparatus of claim 15, wherein said means for feeding thermoplastic to outer laydown means comprises a feed port in said outer laydown plate which is connected to said pressure-balanced reservoir chamber.

* * * * *